G. H. HESS.
STOVE.

No. 247,991.

Patented Oct. 4, 1881.

2 Sheets—Sheet 1.

WITNESSES:
M. E. Dayton
J. W. Wilson

INVENTOR:
Geo. H. Hess.

G. H. HESS.
STOVE.
No. 247,991. Patented Oct. 4, 1881.
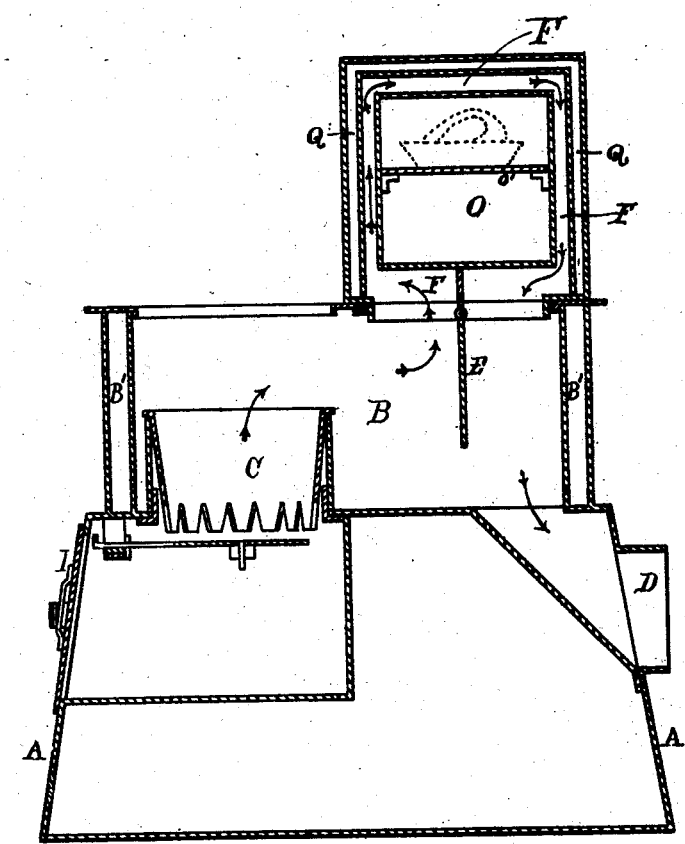
WITNESSES: 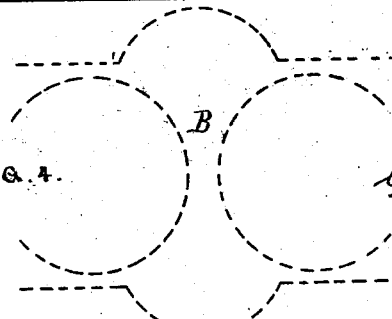 INVENTOR:

UNITED STATES PATENT OFFICE.

GEORGE H. HESS, OF CHICAGO, ILLINOIS.

STOVE.

SPECIFICATION forming part of Letters Patent No. 247,991, dated October 4, 1881.

Application filed January 3, 1878.

*To all whom it may concern:*

Be it known that I, GEORGE H. HESS, of Chicago, in the county of Cook and State of Illinois, have invented certain new and useful Improvements in Camp, Cook, and Laundry Stoves; and I do hereby declare that the following is a full, clear, and exact description of the same, which, taken in connection with the accompanying drawings, will enable any one skilled in the art to make and use the same.

Figure 1:
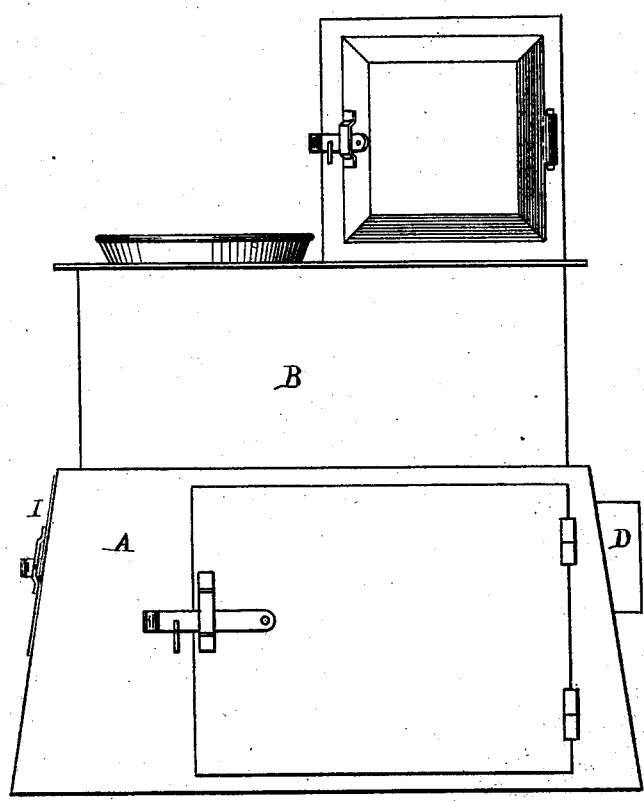
Figure 2:
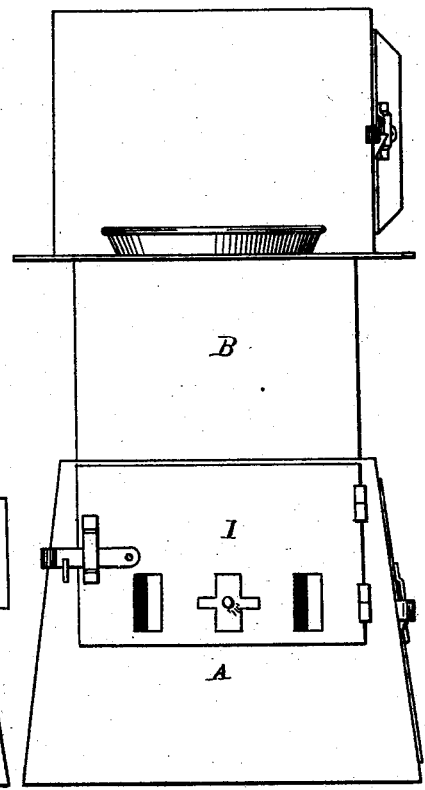

In said drawings, Figure 1 is a side elevation of my improved stove, and Fig. 2 is an end view of the same. Fig. 3 is a central vertical section of said stove; and Fig. 4 is a fragmentary plan view of the heating-chamber, showing the extensions on either side.

Like letters of reference indicate like parts wherever used.

I am aware that a stove has heretofore been constructed with a wall of soapstone or similar non-conductor of heat and with a removable fire-basket; and I am also aware that a stove has been constructed with a fire-pot adhering to one of the walls, a circulatory chamber, and a low-down-flue outlet. I am also aware that a hot-air furnace has been constructed with a fire-pot set within a chamber having a low-down-flue outlet, said fire-pot being unconnected with the wall of said chamber, except at its base and by a metallic box or chute secured to the upper edge of said fire-pot and to the wall as a passage for the introduction of fuel, and a surrounding space through which a current of air was caused to pass to an upper apartment and absorb heat from the wall of the fire-chamber and prevent radiation into the outer atmosphere; but neither of these stoves embraced my invention, nor was capable of exercising its functions, except in part and detachedly. The former had no circulating-chamber nor low-down-flue outlet. The detachment of the fire-pot was only partial and incidental to make it readily removable. In the second and third the circulation was impeded by the fire-pot adherent to the wall. Heat was transmitted by contact to and through the wall, and the wall itself was not protected by any non-conducting medium.

Each of these defects is remedied in my stove; and my invention therefore consists in a circulatory chamber having a top perforated for cooking utensils and with non-heat-conducting walls to receive the hot air and products of combustion from an open fire-pot in one part of said chamber and entirely detached from the wall thereof, and permit said hot products to circulate and stratify, so as to part with the largest possible proportion of its heat before escaping into the flue-outlet located below said fire-pot and only capable of taking away the cooler part of said products. When, therefore, the word "chamber" occurs herein, it is to be understood, as above indicated, in contradistinction to "flue," in which no circulation or stratification can occur.

It also consists in a stove provided with a chamber, as described above, having a detached fire-pot and low-down-flue, provided with a surrounding non-heat-conducting jacket, to prevent the lateral radiation of heat through the walls.

In said drawings, A represents the base of my improved stove.

B is the heating-chamber, surrounded by double walls, forming an air-space, B'.

C is the fire-pot, situated in one end of the heating-chamber and detached from the walls thereof, to which air for combustion is supplied through a door, I, in one end of the base near the fire-pot. As the products of combustion fill the heating-chamber and become cool they pass down and off through the outlet D, situated at that end of the base farthest from the fire-pot.

The fire-pot C is entirely detached from the wall of the chamber B, for the purpose of making said wall practically of uniform temperature all around, as it would not be if heat were transmitted directly by contact from the fire-pot to the wall of the chamber. The fire-pot or basket C is made removable, and is provided with a suitable support or seating above the floor of the chamber B, and immediately over the warming-closet A, so that whenever occasion may require said fire-pot may be lifted out of the stove entirely.

The top of the heating-chamber is provided with suitable holes for cooking purposes. The case containing the oven O, when in use, is placed upon the one farthest from the fire-pot. This oven O is also surrounded by double walls, forming a dead-air space, Q. Hinged to the lower portion of the oven O is a flap or gate, E, extending down into the heating-chamber.

As the heat passes toward the outlet D it encounters this flap or gate, and is caused to pass upward and around the oven O through the space F, between the oven and the outer double wall, and thence down the other side of the gate or flap E toward the outlet D.

The oven O may be provided with suitable shelves, o', for cooking purposes. At either side of the top of the heating-chamber are semicircular extensions for convenience in placing utensils, &c., as shown in Fig. 4.

The object of my invention is to obtain all the heat contained in fuel, and to retain the same within the stove until absorbed by the food, and preventing its passage with the smoke or vapor beyond reach, thus economizing in fuel, producing more perfect combustion of the carbon that otherwise would pass away with the smoke. The hottest portions of the products of combustion will pass quickly to the highest portion of the chamber, and they will be held there until they have parted with the heat contained in them, and as they become cooler they fall to the bottom along with the heavier gases and the smoke and vapor, their places being constantly supplied by the hottest portions rising from the fire. The air within this chamber, finding its level as readily as water and lying in strata, is always hottest at the top, and each stratum below being cooler than its neighbor above. By having a volume of heated air above the fire-pot and filling the chamber, in combination with the escape for vapor and smoke at the lowest part of the chamber, the combustion goes on slowly and controls itself automatically. When the heat is not taken away or absorbed by the food it checks the draft by the force of the expanding air from within the chamber, and as the heat is drawn away, thereby making the chamber cooler, the fire burns more freely.

The double sides to the chamber and the oven form a dead-air space entirely around the same and prevent radiation, confining the heat to the work to be done, and at the same time keeping the cook-room cool.

If desirable, the space between the double sides or jacket of either the stove or oven may be filled with asbestus or any other fire-proof or non-conducting substance.

The walls are constructed double to prevent a rapid conduction of heat from the hot interior to the outer air, and it is evident this object is in a great measure defeated when the fire-pot is in contact with or forms of itself one of the walls of the fire-chamber, because the wall so in contact will be much more strongly heated than either of the other walls.

The advantage of the detached fire-pot in connection with non-conducting walls is manifest. By placing the oven on the top of the stove or heating-chamber it not only receives but is constantly enveloped in the hottest portions of the heat produced, the cooler portions being at the lower part of the chamber. By aid of the flap or gate and its continuation the current of heat is not only turned around the oven, but because the flap becomes a barrier to the horizontal flow of the hotter portion of the products of combustion in the hot chamber B, those portions that have become cooler by parting with their heat are not prevented from dropping down into the chamber until they can reach the outlet at the bottom, thus forming an easy and natural circuit.

With this arrangement of heating chamber and oven the heat can pass around the oven without much smoke or unburned gas, thus making the oven far more effective than can otherwise be attained.

In lieu of the flap being hinged to the oven, as shown, it may be placed in the chamber; but I prefer to hinge it to the oven, as in that case it will be removed with the oven.

Having thus described my invention, what I claim as new, and desire to secure by Letters Patent, is—

1. A camp, cook, or laundry stove constructed with a perforated top for cooking utensils and a chamber, as described, having a non-heat-conducting wall around its sides, and at one end a fire-pot entirely detached from the wall of the chamber except at its base, and a flue-outlet below the top of said fire-pot at another part, whereby the hot air and products of combustion are permitted to circulate against the wall of the chamber all around and stratify, the cooler portion only escaping at its flue-outlet.

2. In combination, a camp, cook, and laundry stove provided with a metal base, which incloses a warming-closet, A, a combustion-chamber, B, above said closet, and an ash-pit projecting into said closet, a fire-pot detached from the chamber-walls, a perforated cover, and a smoke-outlet below the top of the fire-pot, as set forth.

3. The combination of chamber B, having at one end a fire-pot detached from the chamber-walls and a smoke-outlet below said fire-pot, and double walls with dead-air space forming a non-conducting wall surrounding said chamber, whereby the heat of the fire is not transmitted directly to the surrounding air.

GEO. H. HESS.

Witnesses:
SILAS W. MOODY,
J. A. WILSON.